United States Patent
Wendt et al.

(10) Patent No.: US 6,614,402 B1
(45) Date of Patent: Sep. 2, 2003

(54) MOBILE TRANSMISSION ANTENNA

(75) Inventors: Dirk Wendt, Metzingen (DE); Markus Pfletschinger, Eningen (DE)

(73) Assignee: Hirschmann Electronics GmbH & Co. KG, Neckartenzlingen (DE)

( * ) Notice: Subject to any disclaimer, the term of this patent is extended or adjusted under 35 U.S.C. 154(b) by 0 days.

(21) Appl. No.: 09/786,250

(22) PCT Filed: Jun. 10, 1999

(86) PCT No.: PCT/EP99/03984
§ 371 (c)(1),
(2), (4) Date: May 25, 2001

(87) PCT Pub. No.: WO00/14824
PCT Pub. Date: Mar. 16, 2000

(30) Foreign Application Priority Data

Sep. 9, 1998 (DE) .......................................... 198 41 187

(51) Int. Cl.[7] .............................................. H01Q 1/32
(52) U.S. Cl. ...................... 343/713; 343/711; 343/712
(58) Field of Search ................. 343/711, 712, 343/713, 715; H01Q 1/32

(56) References Cited

U.S. PATENT DOCUMENTS 3,794,997 A * 2/1974 Iwatsuki et al. ............ 343/713
4,210,357 A * 7/1980 Adachi ...................... 296/84 B
5,446,470 A * 8/1995 Avignon et al. ............. 343/713
6,191,751 B1 * 2/2001 Johnson ...................... 343/834
6,225,954 B1 * 5/2001 Edvardsson et al. ......... 343/713
6,329,952 B1 * 12/2001 Grace .......................... 343/703

FOREIGN PATENT DOCUMENTS

DE 44 43 596 6/1996

OTHER PUBLICATIONS

Patents Abstracts of Japan, E–1614 Oct. 7, 1994, vol. 18, No. 431.

* cited by examiner

Primary Examiner—Tho Phan
(74) Attorney, Agent, or Firm—Fulbright & Jaworski LLP

(57) ABSTRACT

The present invention relates to a mobile transmission antenna (1) for vehicles that comprises a monopole (8) having a reflector (15) associated therewith. The unit thus formed is mounted on or adjacent to the inner surface of members of the vehicle which are permissive to electromagnetic waves, mainly the vehicle windows (3), so that said reflector (15) is directed towards the inside of the vehicle as seen from the monopole (8). During a transmission, this configuration reduces simply and economically to a harmless level the incident radiation of high-frequency energy that penetrates into the vehicle. The antenna is further protected from potential unauthorised handling from the outside and does not look like an radio-telephone antenna. In a particularly advantageous embodiment of the present invention, the radio-telephone antenna (1) is integrated with a device intended for other purposes, mainly with the third stoplight (4) mounted on the rear window (3) of the vehicle.

8 Claims, 2 Drawing Sheets

MOBILE TRANSMISSION ANTENNA

BACKGROUND

The invention relates to a mobile radio antenna having at least one monopole for motor vehicles.

Such mobile radio antenna designed for sending and receiving high-frequency signals in the frequency range between 0.8 and 1.9 GHz are known from practice in various embodiments as rod or integrated antennas, for example as car telephone antennas.

Rod radiators, such as those used especially as quarter-wavelength or short, thick monopoles ("stub antennas") on the car roof, or such as so-called "on-glass" antennas used for cementing to the car windows, such as the back window, not only undesirably suggest that the car is equipped with a mobile telephone, but they also are accessible for vandalism. To avoid damage in car-washes these antennas are usually made unscrewable and thus are to a great extent liable to theft.

In on-glass antennas, furthermore, due to the production of undesired horizontally polarized field components created by the connecting cable during transmission, an often unreasonable electromagnetic field is produced in the car interior by the usual transmission power of up to eight watts which often is unacceptable. This disadvantage exists even by mobile radio antennas integrated into car windows, in which the antenna design is either applied to the windshield or is sandwiched between the laminations in safety glass.

In on-glass antennas, furthermore, often the necessary electrical counterpoint is not assured, especially when the ground connection is made through the cable without an additional ground surface. Integrated car radio antennas for nonconductive body parts are known not only as window antennas, but even in the case of plastic fenders their use requires an appropriate shape of the fenders, which is not provided in every vehicle. For the at least approximate production of an all-around radiation diagram which is always desirable, two antenna probes arranged at the lateral corners of the fender are necessary. Lastly, this embodiment of the mobile radio antenna is not always best, not only on account of the low height of the mounting location but also on account of the accident-prone exposed location.

SUMMARY OF THE INVENTION

The invention is therefore addressed to the problem of creating a mobile radio antenna of the kind described above, in which the harmful radiation into the car interior during transmission will be minimized and at the same time the danger of vandalism and theft will be reduced in a simple and cost-effective manner.

This problem is solved by the distinctive features of the present invention. By means of the reflector a directional action is produced with little trouble, and due to the arrangement specified the main lobe of the directional diagram points away from the vehicle. Thus radiation into the car interior is possible only from the rear side lobe of this directional diagram, and thus it is greatly reduced. The direction and magnitude (damping) of this side lobe are furthermore easily adaptable to the geometrical circumstances of the vehicle by an appropriate configuration and arrangement of the reflector relative to the monopole. In the case of the preferred mounting in the passenger compartment, the car radio antenna has also a height above the ground that is sufficient for the effectively received and transmitted power that is desired.

Advantageous embodiments and further developments of the mobile radio antenna according to the invention are described in the subordinate claims.

Thus it is at the same time especially desirable for the mounting as well as the preparation and storage to make the monopole and reflector not as separate parts but as a single unit.

If this unit is disposed near the edge of the car roof in cars with a metal roof, its excitation for the actual radiation of the signal energy and for reception will produce in general a desirable all-around radiation characteristic.

Depending on the requirements of the individual case the reflector can be variously configured. In the simplest case it consists of a flat conductive surface whose size is governed substantially by the working frequency range. With a domed configuration of the reflector, however, a greater side lobe damping and a more compact construction is possible in a simple, if slightly more expensive manner. Doming is necessary only in the horizontal plane, because the desired signals in the mobile radio bands are exclusively vertically polarized.

An especially advantageous embodiment of such a mobile radio antenna is characterized by a very compact and mechanically stable construction providing still greater shielding against the radiation of transmitted energy into the vehicle interior. The back wall then constitutes the actual reflector. Since the rod-like monopole attains on the one hand the desired length of about a quarter wavelength and on the other hand fits within the shovel-shaped part, it not only has vertical emission characteristics but also horizontal ones. The undesired horizontal component of the electromagnetic field produced by the latter is minimized by the bottom and the side walls. The wave formation takes place between the monopole and the bottom, the latter forming the counterpoise of the antenna. The antenna terminal is on the back or bottom of the device and is in the form of a coaxial connector to which a coaxial line to the transmitter or receiver can be connected.

A wedge-shaped configuration of the antenna provides for the application most frequent in practice, namely installation on the sloping surfaces of the rear window or windshield of motor vehicles, by equalizing the slope of the surface and aligning the vertical monopole parts vertically even after installation, so that the antenna pattern has the required orientation.

An improvement of the radiation properties of the mobile radio antenna according to the invention is achieved according to claim 8 by avoiding sharp edges at the transitions between the individual surfaces and thus avoiding undesired parasitic interfering effects.

Another important advantage consists in filling with a dielectric the space between the monopole and the reflector or—in the case of an alternative embodiment—the space surrounded by the shovel-shaped part. A substantial reduction of the size of the antenna and thus also a reduction of visual interference in the case of windshield mounting can thus be obtained. By the appropriate selection of the dielectric constants the antenna can also be adapted in a simple manner to the requirements or spatial circumstances of the individual case. Furthermore, it results in an extremely robust mechanical construction, wherein the monopole is stable in position and protectively embedded.

According to another advantageous embodiment of the mobile radio antenna of the invention, the monopole is arranged along the opening surface of the shovel-shaped part, that is, in cross section, along the hypotenuse of this part, so that in this longest part of the wedge it reliably has the desired length of about a quarter wavelength even at frequencies in the lowest working frequency range.

Instead of a straight rod antenna, a bent configuration of the monopole can be selected, with the advantage that the antenna terminal in the bottom can be freely chosen within limits and thus can be located so as to correspond to the space conditions in different vehicles.

Various advantageous alternatives are described for mounting the mobile radio antenna. It can either be permanent (glued, for example) or removable—say, by mounting the antenna with screws. It is especially advantageous to integrate the antenna into a fixedly disposed device provided for other purposes, as for example in a third brake light mounted at the upper margin of the back window of the car because in this case the antenna needs neither additional space nor special mounting means. Moreover, the routing of wiring is reduced, thereby lowering production costs.

In the case of an opaque dielectric, to enable both the mobile radio antenna and the third brake light to serve their purpose, the two devices can be positioned side by side in the common housing, so that the latter must be comparatively wide and may slightly interfere with the view through the back window. It is therefore especially advantageous to use for the dielectric a translucent material, i.e., glass, for example, or transparent plastic, and at the same time to design the back wall of the shovel-shaped part such that it is sufficiently transparent for the light from the brake light, on the one hand, and on the other hand is effective as an antenna reflector in the mobile radio frequency range, and the stated grid-like configuration of the rear wall is especially suited for that purpose.

By this embodiment it is possible to arrange the mobile radio antenna ahead of the bulb of the third brake light, so that the entire apparatus has no more than the width of the housing of the third brake light and the antenna thus does not additionally interfere with the line of sight.

Furthermore, even upon careful inspection no mobile radio antenna can then be recognized and to this extent no indication is given of the presence of a mobile telephone. Lastly, due to the arrangement at the upper edge of the window, a circular characteristic of the antenna pattern can desirably be achieved, and thus reception and transmission are largely independent of the direction of travel. The directional characteristic of the antenna itself prevents any unwanted radiation of high-frequency energy into the passenger compartment.

The reflector, or alternatively, the bottom and side walls as well, can consist of metal (sheet steel, for example). Less expensive and easier to create in any shape, however, is construction of metallized plastic.

If the mobile radio antenna has a shovel-shaped portion an especially low-cost production can be achieved with little trouble by providing the dielectric with a metal coating.

An additional advantageous design of a mobile radio antenna constructed is due to the possibility of shifting the antenna connection point by means of a low-cost coplanar conductor to any desired point on the bottom that is appropriate to the available space in any application, the arrangement of the monopole within the shovel-shaped part can be optimal in regard to the desired radiation pattern and matching. Thus it is also possible to use the antenna without modification at various points of use in the vehicle interior.

To optimize the radiation pattern of the mobile radio antenna as well as its input impedance, the feed point as well as the shape and length of the monopole is selected accordingly, in a manner known in itself, and in some cases a top load will be placed at the free end of the monopole.

Another advantageous possibility of optimizing especially the angular position and damping of the side lobes regardless of the said influences. Of course, this configuration of the mobile radio antenna of the invention involves comparatively great effort for its development and manufacture.

The invention is further explained below with the aid of an embodiment shown in the figures of a mobile radio antenna integrated in the third brake light of a motor vehicle.

DETAILED DESCRIPTION OF THE PREFERRED EMBODIMENTS

Figure 1:
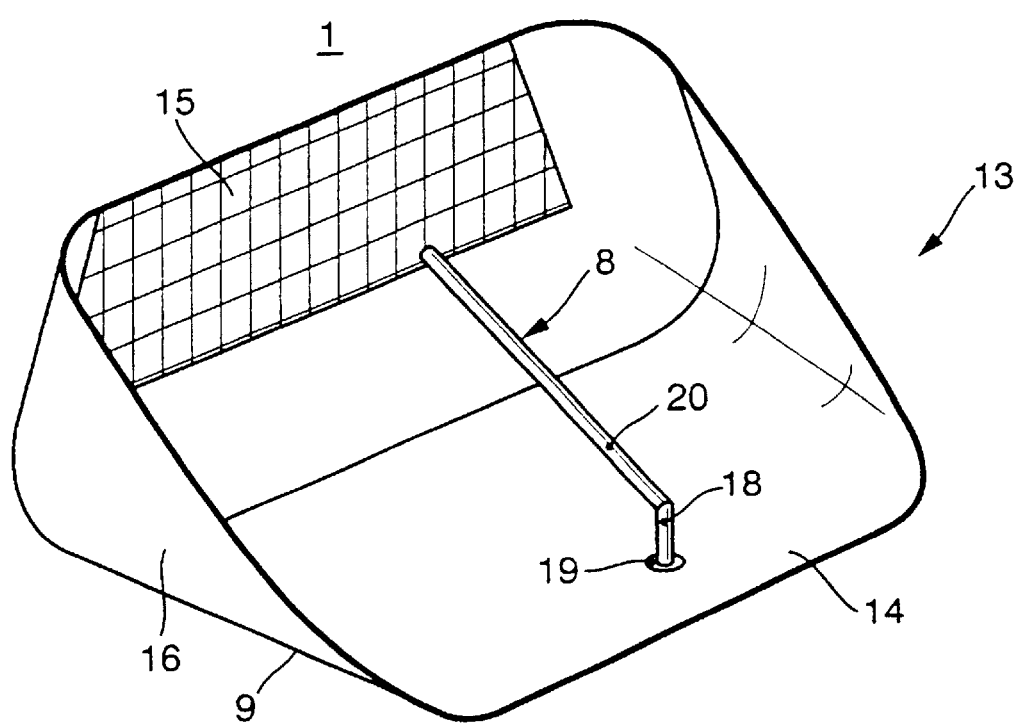
FIG. 1 is a perspective view of the antenna part.
Figure 2:
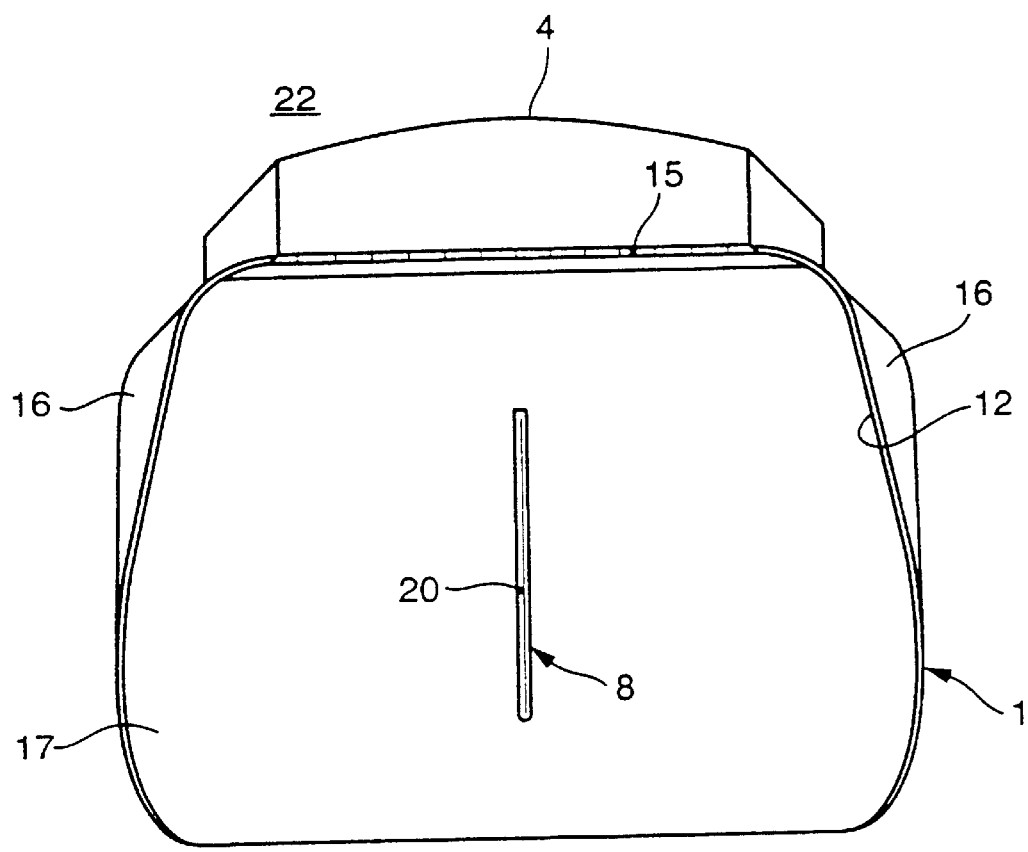
FIG. 2 a schematic drawing of the brake light with integrated antenna in a plan view.
Figure 3:
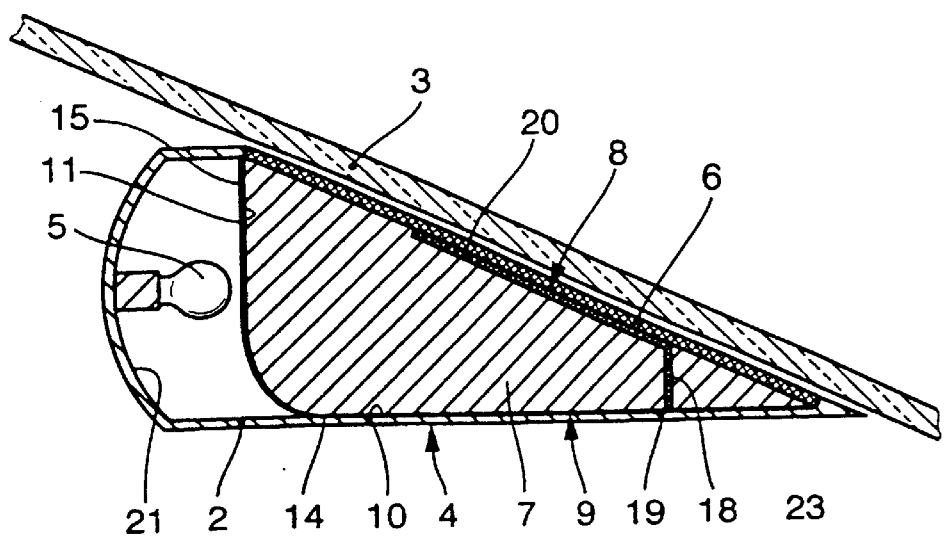
FIG. 3 a section through the basic construction of this unit and its arrangement on a back window of a motor vehicle.

The mobile radio antenna 1 is disposed in the housing 2 of a motor vehicle's back window 3 with a third brake light 4 fastened with holding means not shown, which has an incandescent bulb 5 and a transparent red signal lens 6 in an area of the housing 2 facing the back window 3.

The mobile radio antenna 1 consists of a translucent dielectric wedge 7, a monopole antenna 8 cast therein, and a metal coating 9 applied to the dielectric wedge 7. The dielectric constant of wedge 7 permits such a small size of the antenna that it also fits into the conventional housing of a third brake light.

The dielectric wedge 7 has a bottom surface 10, a back surface 11 rising vertically therefrom, and two approximately triangular side surfaces 12. These surfaces 10 to 12 are provided with the metal coating 9 which thus forms a shovel-like metal part 13 with the bottom 14, a back wall 15 and two side walls 16. The metal coating completely covers the bottom surface 10 and the side surfaces 12 of the dielectric wedge 7, while the back wall 15 is grid-like in form. The uncoated surface 17 of the dielectric wedge 7, which is the open face of the metal part 13 lies directly on the inside of the signal lens 6. The meeting edges of surfaces 10 to 12 of the dielectric wedge 7 and thus also of the shovel-like metal part 13 are rounded and cornerless.

The monopole antenna 8 is of a bent shape, a short section 18 at the terminal end passing through an opening 19 in the bottom 14 and leads to a coaxial junction, and a longer section 20 runs along the surface of the opening 17 of the shovel-like metal part 13 and the inside surface of the signal lens 6.

The incandescent bulb 5 of the third brake light 4 is arranged approximately at the focal point of a parabolic reflective wall 21 of housing 2 behind the grid-like rear wall 15 of the shovel-like metal part 13.

With the described construction, the combination unit 22 serves simultaneously as a brake light 4 and as a mobile radio antenna 1. The light of the bulb 5 is focused in full strength by the reflective wall 21 on the signal lens 6, and due to the grid-like texture of the back wall 15 of the shovel-shaped metal part 13 and the use of a translucent dielectric 7 so little attenuation occurs that the brightness of the brake light is virtually the same as without an integrated antenna.

The grid-like texture of the back wall 15 is of such a size regarding the spacing of the grid lines or—to put it differently—the size of the spaces between them is such that it allows the light of the bulb 5 to pass through it in virtually full strength, but in the mobile radio operating frequency range it acts as a reflector. The bottom 14 is, in the manner described, a counterpoise for the monopole 8 and together with the side walls 15 it produces a minimization of the unwanted horizontal components of the electromagnetic field.

In this combination device 22 it cannot be seen that it contains a mobile radio antenna. Furthermore, interference from the outside is impossible, and the mobile radio antenna is stable and well protected against weather.

Due to the shielding provided by the shovel-shaped metal piece 13 and the directional pattern produced by it, only a harmlessly small part of the transmit energy penetrates into the vehicle interior 23.

Furthermore, due to the edge-less design of the metal piece 13, parasitic interference that might undesirably affect the radiation pattern is avoided. Lastly, since the antenna 1 is integrated into the housing 2 of the brake light 4, no special housing is needed, nor any device for mounting the antenna.

What is claimed is:

1. A mobile radio antenna comprising:

a monopole and a reflector associated with said monopole, said antenna disposed on a surface of a vehicle, said surface being permeable to electromagnetic waves;

a shovel-shaped piece of conductive material, said shovel-shaped piece comprising a back wall, a bottom wall, and first and second side walls, said side walls being disposed on opposite sides of said bottom wall and rising substantially vertically from said opposite sides to said back wall, said bottom wall, first and second side walls, and back wall define a shovel-shaped part having an interior area, and said reflector is disposed on said back wall and said monopole is disposed within the interior area of said shovel-shaped part; and a translucent dielectric disposed between said monopole and said reflector, said reflector comprising said back wall and having a grid design.

2. The antenna of claim 1, wherein said reflector comprises metallized plastic.

3. The antenna of claim 1, wherein said shovel-shaped part comprises metallized plastic.

4. The antenna of claim 1, wherein said shovel-shaped part comprises metallized material coating said dielectric.

5. A mobile radio antenna comprising:

monopole;

a reflector associated with said monopole;

a dielectric disposed between said monopole and said reflector;

a shovel-shaped part having an interior area, said interior area surrounding said monopole, said reflector and said dielectric on at least two sides; and a back wall of said shovel-shaped part having a grid configuration.

6. The antenna of claim 5, wherein said antenna is housed in a third break light of a motor vehicle.

7. A mobile radio antenna comprising;

a monopole and a reflector associated with said monopole, said antenna disposed on a surface of a vehicle, said surface being permeable to electromagnetic waves; and a translucent dielectric disposed between said monopole and said reflector, said reflector comprising a back wall and having a grid design.

8. The antenna of claim 7, wherein said reflector comprises metallized plastic.

* * * * *